United States Patent [19]

Emori et al.

[11] Patent Number: 5,069,250
[45] Date of Patent: Dec. 3, 1991

[54] ROTARY VALVE FOR POWER STEERING APPARATUS

[75] Inventors: Yasuyoshi Emori; Yukimitsu Ninamibata, both of Saitama, Japan

[73] Assignee: Jidosha Kiki Co., Ltd., Tokyo, Japan

[21] Appl. No.: 581,281

[22] Filed: Sep. 12, 1990

[30] Foreign Application Priority Data

Sep. 20, 1989 [JP] Japan .................................. 1-109850

[51] Int. Cl.⁵ ...................... F15B 13/02; F16K 11/076
[52] U.S. Cl. ............................ 137/625.23; 137/625.24; 91/375 A
[58] Field of Search ..................... 137/625.21, 625.22, 137/625.23, 625.24; 91/375 A, 375 R

[56] References Cited

U.S. PATENT DOCUMENTS

| 4,381,799 | 5/1983 | Sato | 91/375 A X |
| 4,561,516 | 12/1985 | Bishop et al. | 91/375 A X |
| 4,699,174 | 10/1987 | Bishop | 137/625.24 |

Primary Examiner—Alan Cohan
Attorney, Agent, or Firm—Flynn, Thiel, Boutell & Tanis

[57] ABSTRACT

A rotary valve for power steering apparatus includes an input shaft, an output shaft disposed in axial alignment with the input shaft and connected thereto by a torsion bar, a valve rotor formed on the input shaft, and a valve sleeve connected to the output shaft and fitted over the valve rotor. A return oil path in the input shaft is formed inside a step defined in the internal surface of the valve sleeve while a return oil path in the valve sleeve is formed in a cylindrical portion of an increased internal diameter and extends therefrom along the step to define a return flow groove.

5 Claims, 2 Drawing Sheets

ROTARY VALVE FOR POWER STEERING APPARATUS

BACKGROUND OF THE INVENTION

The invention relates to a rotary valve for power steering apparatus, and in particular, to a valve sleeve which forms part thereof.

A power steering apparatus generally comprises an input shaft which is turned by a steerable wheel, and an output shaft disposed in axial alignment with the input shaft, which are connected together by a torsion bar disposed between them and in axial alignment therewith. A rotary valve comprises a valve rotor which is formed around the outer surface of the input shaft, and a valve sleeve disposed in surrounding relationship with the valve rotor for integral rotation with the output shaft. The rotary valve is switched as a result of a relative rotation between the both shafts, thereby controlling the delivery to or discharge from a power cylinder of hydraulic fluid.

The valve sleeve which forms the rotary valve normally comprises a pipe section of an increased internal diameter and another pipe section of a reduced internal diameter. The output shaft is fitted into the pipe section of an increased diameter, with its end face disposed in opposing relationship with a step defined between the both pipe sections. A radially extending pin which is a press fit into the pipe section of an increased diameter serves connecting the valve sleeve and the output shaft together. A radially extending return oil path is formed in the valve sleeve at the step between the both pipe sections and also in the input shaft at a location situated radially inward of the step, thereby providing a communication between a flow path for the return oil which passes through the axial portion of the input shaft and over the outer surface of the valve sleeve.

In the described rotary valve, the return oil path in the valve sleeve is formed in the region of the abutment of the valve sleeve and the output shaft, or extending across the step formed in the inner surface. This causes burrs to be produced during a boring operation, and an additional machining operation is required to remove such burrs, disadvantageously causing an increased cost. In addition, use of the region of abutment between the valve sleeve and the output shaft as a return oil path causes part of the return oil path which is formed in the valve sleeve to be closed by the output shaft, resulting in disadvantages that an available channel area is reduced to give rise to the occurrence of acoustical oscillations in the fluid and that an increased pressure loss results.

SUMMARY OF THE INVENTION

Accordingly, it is an object of the invention to provide a rotary valve which is provided with a valve sleeve minimizing the occurrence of acoustical oscillations in the fluid and the pressure loss.

DESCRIPTION OF EMBODIMENT

Figure 1:
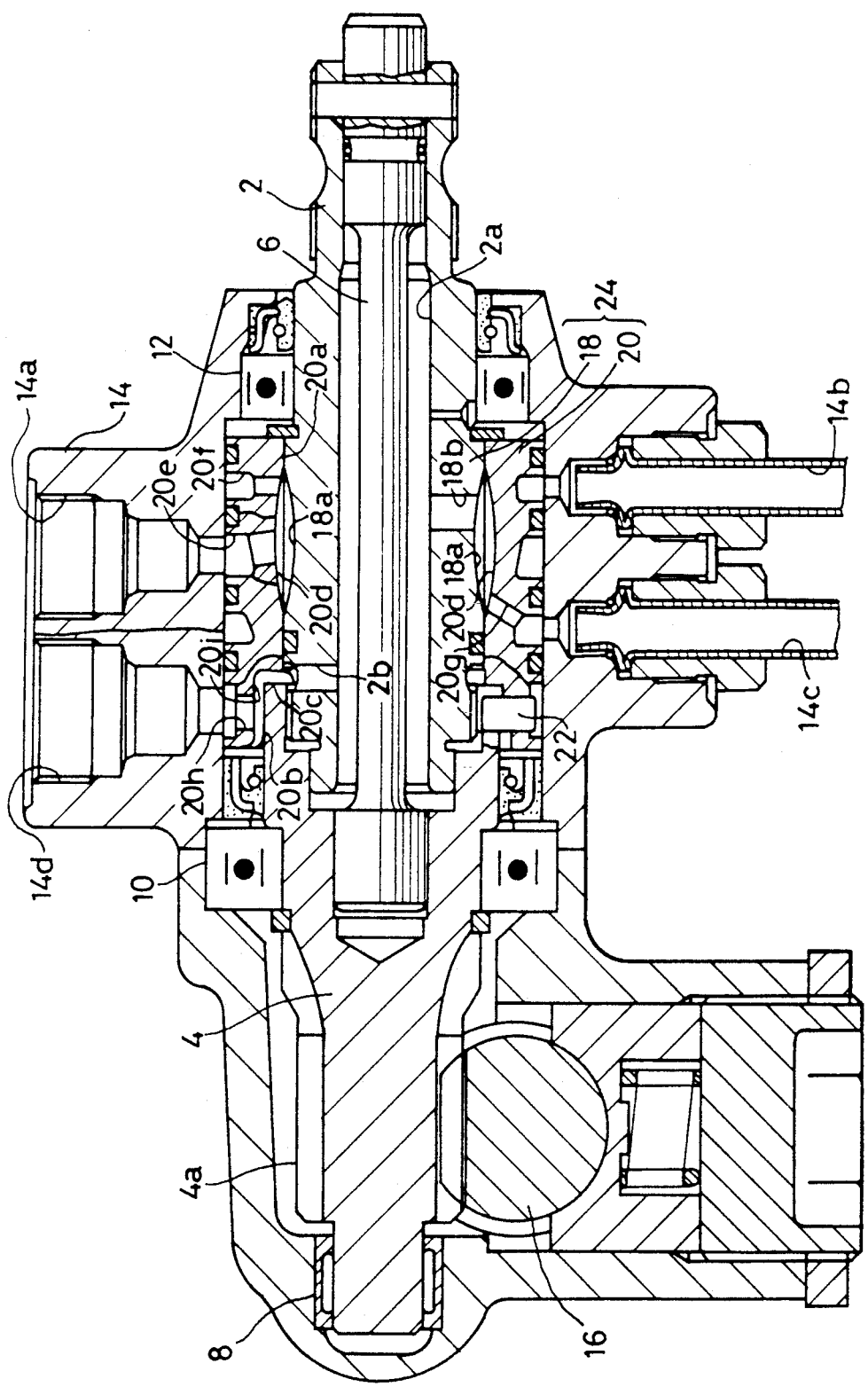
FIG. 1 is a longitudinal section of a power steering apparatus which is provided with a rotary valve according to one embodiment of the invention.

Referring to the drawings, an embodiment of the invention will now be described. FIG. 1 is a longitudinal section of a power steering apparatus which is provided with a rotary valve according to one embodiment of the invention. An input shaft or stub shaft 2 is connected to a steerable wheel, not shown, so as to be turned thereby. At its one end, an output shaft 4 is formed with a pinion 4a, and thus the output shaft may be referred to as a pinion shaft. The both shafts 2 and 4 are coupled together by a torsion bar 6 disposed in a space 2a which is formed in the axial portion of the input shaft 2. The both shafts are rotatably mounted in a housing 14 by means of bearings 8, 10 and 12 so as to permit a relative rotation therebetween over a given angle. The pinion 4a meshes with a rack 16 to define a steering gear of rack and pinion type.

A valve rotor 18 is directly formed around the outer surface of the input shaft 2 while a valve sleeve 20 which is fitted over the valve rotor 18 is connected to the output shaft 4 by a pin 22 for integral rotation. The combination of the valve rotor 18 and the valve sleeve 20 defines a rotary valve 24.

The valve sleeve 20 includes a cylindrical portion 20a of an internal diameter which is substantially equal to the external diameter of the valve rotor 18, and another cylindrical portion 20b of an internal diameter greater than that of the cylindrical portion 20a. An end of the output shaft 4 is inserted into the cylindrical potion 20b, with its end face disposed in opposing relationship with a step 20c formed in the valve sleeve 20.

Around the inner peripheral surface, the cylindrical portion 20a of a reduced internal diameter of the valve sleeve 20 is formed with six axially extending grooves 20d while the outer peripheral surface of the valve rotor 18 is also formed with six axially extending grooves 18a. At a neutral position, the axial grooves 18a or 20d are maintained at positions which are located opposite to lands defined between the adjacent grooves of the mating member. While six axial grooves 18a and 20d are used in this embodiment, each member may have an equal even number of grooves other than six, such as eight.

Every other land of the valve sleeve 20 is formed with a radial opening 20e which communicates with a pump port 14a formed in the housing 14, and the axial grooves 20d located on the opposite sides of the radial opening 20e are formed with passages 20f, 20g which communicate with ports 14d, 14c, respectively, leading to both chambers of a power cylinder. The axial grooves 18a located on the opposite sides of a particular axial groove 18a in the valve rotor 18 which is located opposite to the radial opening 20e in the valve sleeve 20 at a neutral position are formed with radial openings 18b which communicate with the space 2a defined inside the input shaft 2.

In addition, the input shaft 2 is formed with a radially extending through-opening 2b adjacent to the step 20c defined in the valve sleeve 20, or in the region where the end face of the output shaft 4 is located opposite to the valve sleeve 20.

Figure 2:
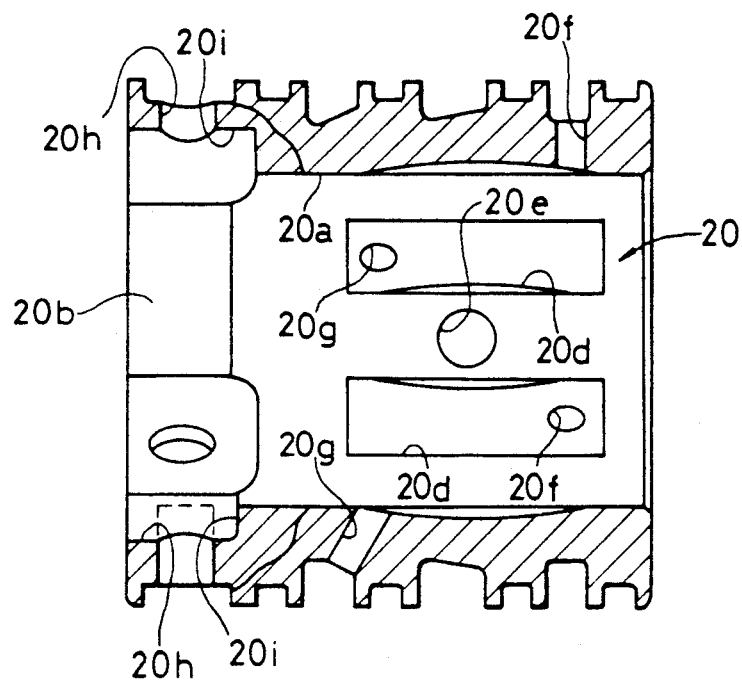
FIG. 2 is a longitudinal section of the valve sleeve.
Figure 3:
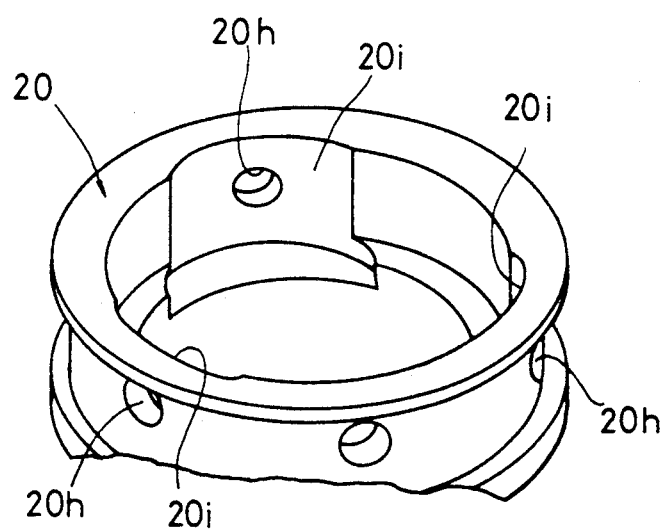
FIG. 3 is a perspective view of part of the valve sleeve.

On the other hand, the cylindrical portion 20b having an increased internal diameter of the valve sleeve 20 is formed with a radially extending, through-opening 20h which communicates with a tank port 14d formed in the housing 14, and a return flow groove 20i which extends from the inner side of the through-opening 20h to the through-opening 2b formed in the input shaft 2 along the step 20c (see FIG. 2). Three of such through-openings 20h and return flow grooves 20i are disposed in the present embodiment as circumferentially spaced apart at an equal interval (see FIG. 3).

In the neutral position of the rotary valve 24 described above, an oil discharged from a pump passes through the pump port 14a, the radial opening 20e formed in the valve sleeve 20, the axial grooves 18a and 20d formed in the valve rotor 18 and the valve sleeve 20, the radial opening 18b formed in the valve rotor 18, the internal space 2a of the input shaft 2, the radially extending through-opening 2b formed in the input shaft 2, the return flow groove 20i formed in the internal surface of the valve sleeve 20, the through-opening 20h and the tank port 14d to be returned to the tank.

When the steerable wheel is operated, a relative rotation occurs between the valve rotor 18 and the valve sleeve 20, whereby the oil which is introduced into the rotary valve 24 from the pump port 14a is fed through the passage 20f or 20g to one of the chambers in the power cylinder while the oil is displaced from the other chamber to the tank by passing through the other passage 20f or 20g, the axial grooves 20d and 18b, the radial opening 18b, the space 2a defined inside the input shaft 2, the through-opening 2b formed in the input shaft 2, the return flow groove 20i and the through-opening 20h formed in the valve sleeve 20.

As a result of forming the return flow groove 20i in the internal surface of the valve sleeve 20 for connecting the through-opening 2b in the input shaft 2 with the through-opening 20h in the valve sleeve 20 to provide a return oil path to the tank, there is secured a sufficient effective channel area for the return flow path, thus reducing the pressure loss and minimizing the occurrence of acoustical oscillations in the fluid. Forming the through-opening 20h of the valve sleeve 20 in the cylindrical portion 20b so as to avoid the step 20c minimizes burrs which may be produced during a boring operation, thus greatly facilitating a deburring operation. In addition, since the return flow groove 20i may be formed by a forging operation, a cost involved in the material and the machining operation may be reduced.

While the invention has been disclosed above in connction with an embodiment thereof, it should be understood that the disclosure is exemplary only, and that a number of changes, modifications and substitutions therein will readily occur to one skilled in the art from the above disclosure without departing from the spirit and scope of the invention defined by the appended claims.

What is claimed is:

1. A rotary valve for a power steering apparatus, comprising:
an input shaft which is turned in response to an operation of a steerable wheel, an output shaft disposed in axial alignment with said input shaft and rotatable relative thereto, a valve rotor disposed on said input shaft, and a hollow valve sleeve disposed in surrounding relationship with said valve rotor and connected to said output shaft for integral rotation therewith, an internal surface of said hollow valve sleeve being divided into sections of an increased and a reduced internal diameter section with a step defined therebetween, said input shaft being fitted into said hollow valve sleeve toward said step, means defining a plurality of return oil paths formed in said input shaft and said hollow valve sleeve for providing a communication between an axial portion of said input shaft and an outer surface of said hollow valve sleeve, wherein said return oil paths on said hollow valve sleeve include a plurality of circumferentially spaced recesses in said increased internal diameter section and said step, whereby a plurality of return flow grooves are formed between an axially facing end of said hollow valve sleeve, which end has said increased internal diameter section therein, and a mutually adjacent end of said output shaft, each groove extending from a radially inner portion of each of said return oil paths to a portion of said return oil paths disposed along said step and a radial exterior of said output shaft.

2. The rotary valve according to claim 1, in which said return oil path on said hollow valve sleeve is defined by a radially extending through-opening communicating with an interior of said increased internal diameter section of said hollow valve sleeve.

3. The rotary valve according to claim 2, in which three return oil paths and return flow grooves are formed in said hollow valve sleeve and are equidistantly spaced apart.

4. The rotary valve according to claim 1, in which the return oil paths in said input shaft comprises a radially extending through-opening located radially inwardly of said step in said hollow valve sleeve.

5. The rotary valve according to claim 4, in which three return oil paths are formed in said input shaft and each thereof are circumferentially and equidistantly spaced apart.

* * * * *